US009372069B2

(12) United States Patent
Knuepfer et al.

(10) Patent No.: US 9,372,069 B2
(45) Date of Patent: Jun. 21, 2016

(54) METHOD FOR MEASURING THE LENGTH OF AN ELECTRIC CABLE THAT USES AN OPTICAL FIBRE ELEMENT AS A SENSOR

(75) Inventors: Bernd Knuepfer, Milan (IT); Davide Sarchi, Milan (IT)

(73) Assignee: PRYSMIAN S.P.A., Milan (IT)

( * ) Notice: Subject to any disclaimer, the term of this patent is extended or adjusted under 35 U.S.C. 154(b) by 224 days.

(21) Appl. No.: 13/989,956

(22) PCT Filed: Nov. 29, 2010

(86) PCT No.: PCT/IT2010/000475
§ 371 (c)(1),
(2), (4) Date: Oct. 11, 2013

(87) PCT Pub. No.: WO2012/073260
PCT Pub. Date: Jun. 7, 2012

(65) Prior Publication Data
US 2014/0049786 A1 Feb. 20, 2014

(51) Int. Cl.
*G01B 11/06* (2006.01)
*G02B 6/44* (2006.01)
(Continued)

(52) U.S. Cl.
CPC .............. *G01B 11/02* (2013.01); *G01B 11/028* (2013.01); *G01D 5/35358* (2013.01); *G02B 6/4401* (2013.01)

(58) Field of Classification Search
CPC .. G01B 11/02; G01B 11/028; G01D 5/35303; G02B 6/4401; G02B 6/44
USPC .......... 356/634; 385/101, 102, 100, 106, 107, 385/109, 111–113; 73/800, 847; 398/168; 340/854.7, 854.9
See application file for complete search history.

(56) References Cited

U.S. PATENT DOCUMENTS

| 5,801,818 A | 9/1998 | Corrigan et al. |
| 6,252,660 B1 | 6/2001 | Frisch et al. |

(Continued)

FOREIGN PATENT DOCUMENTS

| CN | 1218901 A | 6/1999 |
| DE | 19847617 A1 | 5/2000 |

(Continued)

OTHER PUBLICATIONS

Decision on Grant from the Federal Service for Intellectual Property of the Russian Federation in counterpart Russian Application No. 2013129868 (Nov. 27, 2014).

(Continued)

*Primary Examiner* — Tarifur Chowdhury
*Assistant Examiner* — Sunghee Y Gray
(74) *Attorney, Agent, or Firm* — Finnegan, Henderson, Farabow, Garrett & Dunner, L.L.P.

(57) ABSTRACT

A method of measuring the length of an electric cable, includes providing an electric cable having a cable length and including a cable neutral axis, and a fiber unit longitudinally extending along the cable and including an optical fiber arranged substantially along the neutral axis, wherein the optical fiber is mechanically coupled with the cable; injecting an optical signal into the optical fiber; detecting back-scattered light from the optical fiber responsive to the injected optical signal; analyzing the detected back-scattered light as a function of time so as to determine the length of the optical fiber, and deriving the cable length from the length of the optical fiber.

12 Claims, 5 Drawing Sheets

(51) Int. Cl.
*G01L 1/24* (2006.01)
*G01N 3/22* (2006.01)
*G01V 3/00* (2006.01)
*H04B 10/00* (2013.01)
*G01R 31/28* (2006.01)
*G01B 11/02* (2006.01)
*G01D 5/353* (2006.01)

(56) References Cited

U.S. PATENT DOCUMENTS

| | | | |
|---|---|---|---|
| 6,745,487 B1 | 6/2004 | Nield | |
| 2005/0078922 A1* | 4/2005 | Sanders et al. | 385/101 |
| 2006/0181283 A1 | 8/2006 | Wajcer et al. | |
| 2007/0062696 A1* | 3/2007 | Wilson et al. | 166/254.2 |
| 2008/0141548 A1 | 6/2008 | Birchinger et al. | |
| 2010/0266248 A1* | 10/2010 | Neuroth | G02B 6/502 385/101 |
| 2012/0051701 A1* | 3/2012 | Sicari et al. | 385/100 |
| 2012/0174683 A1* | 7/2012 | Kemnitz et al. | 73/800 |

FOREIGN PATENT DOCUMENTS

| | | |
|---|---|---|
| EP | 0 203 249 A2 | 12/1986 |
| GB | 2 386 921 A | 5/2002 |
| GB | 2368921 A | 5/2002 |
| RU | 62984 U1 | 5/2007 |
| WO | WO 03/091781 A1 | 11/2003 |
| WO | WO 2005/035461 A1 | 4/2005 |
| WO | WO 2008/037291 A1 | 4/2008 |
| WO | WO 2008/073033 A1 | 6/2008 |
| WO | WO 2010/092256 A2 | 8/2010 |
| WO | WO 2010/0126467 A1 | 11/2010 |

OTHER PUBLICATIONS

ITU-T G.657; "Characteristics of a Bending-Loss Insensitive Single-Mode Optical Fibre and Cable for the Access Network", Telecommunication Standardization Sector of ITU, Series G: Transmission Systems and Media, Digital Systems and Networks, Transmission Media and Optical Systems Characteristics—Optical Fibre Cables, pp. 1-13, (2009).

International Search Report from the European Patent Office for International Application No. PCT/IT2010/000475, mailing date Apr. 21, 2011.

Written Opinion of the International Searching Authority from the European Patent Office for International Application PCT/IT2010/000475, mailing date Apr. 21, 2011.

* cited by examiner

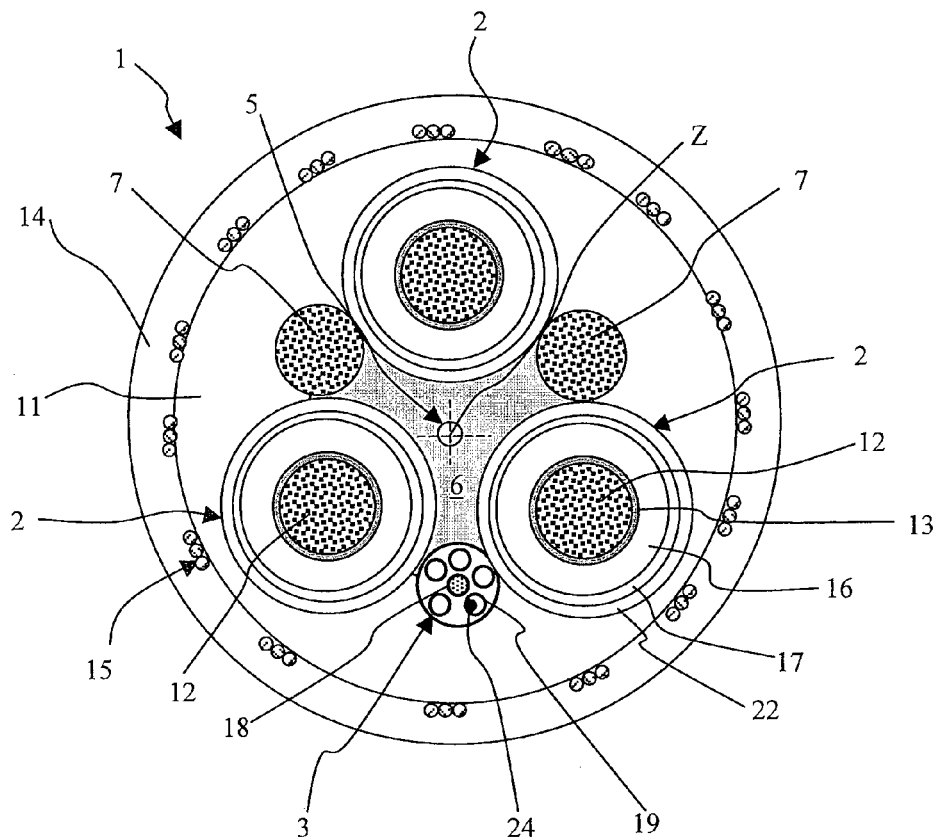
FIG. 1
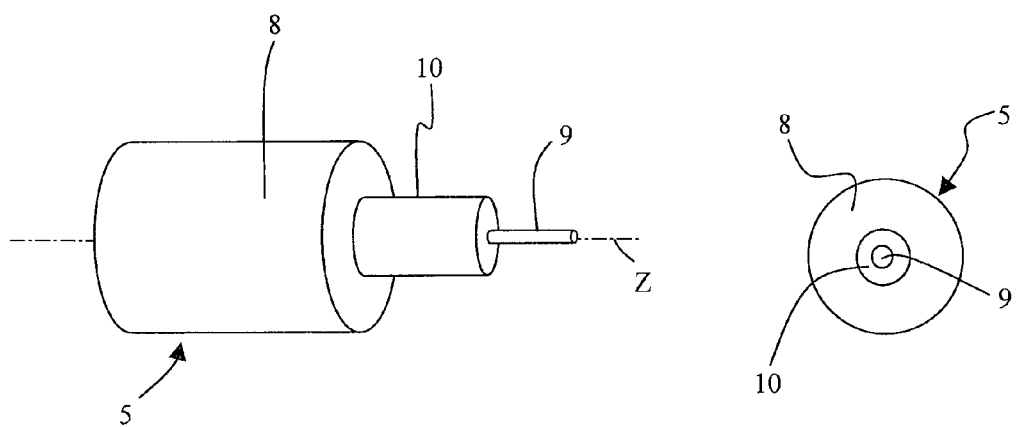
FIG. 2a                    FIG. 2b

METHOD FOR MEASURING THE LENGTH OF AN ELECTRIC CABLE THAT USES AN OPTICAL FIBRE ELEMENT AS A SENSOR

CROSS REFERENCE TO RELATED APPLICATION

This application is a national phase application based on PCT/IT2010/000475, filed Nov. 29, 2010, the content of which is incorporated herein by reference.

BACKGROUND OF THE INVENTION

1. Field of the Invention

The present invention is directed to a method for measuring the length of an electric cable.

2. Description of the Related Art

The length of a cable can play a critical role in the transmission of the signals carried thereby. WO 2010/126467 discloses a method for indicating the input cable length for serial digital interface signals. The method comprises measuring a differential that varies between first (+1 V) and second values (−1 V) approximately linearly in proportion to a characteristic of a signal at an end of the cable, and translating the measured differential voltage into a cable length measurement.

WO 2010/092256 describes a device for measuring the length of a moving cable provided with marks, which are fixed at predefined intervals along the cable. The device comprises electronic detection means, which are suitable for automatically detecting, on the moving cable, every local change in the transverse geometry linked to the presence of a mark.

Logging operations in oil and gas wells in general require accurate determination of the location of the logging tool in the borehole of the well. A way to accomplish the accurate location determination of the logging tool during logging operations involves monitoring the downhole length of the cable or wireline supporting the logging tool payed into or reeled out of the well bore by the cable draw works. Monitoring of the length can be performed by using a calibrated count wheel which is matched precisely to the diameter of the wireline or cable loaded onto the cable drum/reel of the draw works to generate a distance of travel signal for the length of cable payed out or reeled in. U.S. Pat. No. 6,745,487 describes a downhole cable length measuring apparatus comprising three major components: a rotational distance measuring assembly; a rotation-to-length, calibration assembly, and a processor unit.

Cable length sensors of a cable that is wound on a cable drum have been used. Generally, the cable is fastened on one of its end sides and is pre-tensioned by a return element. Since the diameter of the cable drum is known, the cable length drawn off can be determined by means of the sensor through an evaluation unit, which is usually external. US 2008/0141548 relates to a cable length sensor in which the return device is disposed in a housing and coupling means for coupling the return device to the direction of turning of the cable drum is provided. Fixing means, which can be actuated from outside of the housing and which serves for fixing the current position of the return device, in particular the at least slightly pre-tensioned starting position of the return device, is associated with the housing.

In some applications, customers can be charged for cable and installation by the total length purchased or installed. In such cases, it can be useful to measure length of cable after installation without the requirement to measure it beforehand. US 2006/181283 discloses a cable diagnostic mechanism that utilizes time domain reflectometry (TDR) to detect and identify cable faults, perform estimations of cable length, identify cable topology, identify load and irregular impedance on metallic paired cable, such as twisted pair and coaxial cables.

Since the measurement made using TDR is performed on electric conductors, when the conductors are stranded around the cable axis—a very common configuration—the length of the conductor is higher than the length of the cable, and this difference is not known with satisfactory accuracy because the lay up pitch is not exactly controlled.

WO 08/073,033 describes a system for monitoring the bending and strain of a power cable connected to a moving offshore platform by measuring the strain in optical fibres attached to or incorporated into the power cable. A bend in the power cable will give rise to a strain in the optical fibre and this strain will change the optical properties of the fibre. The change in optical properties can be measured by means of optical time domain reflectometer (OTDR) or optical frequency domain reflectometer (OFDR).

GB 2368921 discloses a wellbore cable having spaced apart ends including a first end and a second end, a hollow metal tube extending from the first end to the second end thereof, and at least one fibre optic loosely disposed within the hollow metal tube and extending therein from the first end to the second end thereof. The at least one fibre optic has least one fibre Bragg grating.

EP 0203249 discloses a medium-voltage (from 6 to 60 kV) power cable that includes at least one temperature and/or tension sensor optical fibre.

Typically, electric cables are delivered to customers coiled about bobbins together with the information of the nominal length of the wound cable. In some applications, such as for use in a down well environment, it can be important to know the "real" length of the payed off cable so as to define the route of the cable along the deployment. Apparently negligible lengths, such as 1 meter or less, especially when missing, can give rise to inconvenience.

SUMMARY OF THE INVENTION

The Applicant has observed that, in some instances, customers may request a cable that is provided with splice connectors, which thus need to be provided in the factory before delivery of the cable. Preparing in the factory the cable ends for field splice has a great advantage of reducing the splicing procedure in the field, and working in a controlled (clean) environment with higher quality results. In this case, if the cable length section between subsequent splice connectors does not correspond to the required length section in the environment of use, the cable section could result to be too short or too long to be connected to the existing splice locations along the cable route. Especially in case of cable sections containing multiple cable spans it may not be straightforward to cut and fit the cable length sections.

In some other instances, customers may want to control the cable length after delivery of the cable.

The Applicant has observed that measurement of cable length by using a mechanical device that moves along the cable length may be unpractical when deployment of the cable follows a complex route and/or the cable length is relatively large, e.g. exceeding 1 km.

The Applicant has considered employing methods that measure the differential voltage variation resulting from the connection of the input cable to an input port or methods that detect reflected electrical pulses. However, such methods involve electrical measurement along one or more electrical conductors within the cable, which are, in typical cable configurations, helically wound about the central longitudinal axis of the cable. This implies that the length of the measured electrical conductors is in general greater than the length of the cable that includes them. This fact introduces an uncertainty in the determined cable length. The inaccuracy in the determined length value is in absolute value greater the greater the cable length.

The Applicant has observed that in electric cables provided with at least one optical fibre, the cable length can be measured by optical techniques that detect the light transmitted and/or reflected along the optical fibre. In addition, the Applicant has noted that if the electrical cable is provided with an optical fibre loosely inserted in a longitudinally extending module, such fibre usually has an excess fibre length with respect to the length of the cable, which introduces inaccuracy in the correspondence between the measured length and the actual cable length. Inaccuracy can derive also from the fact that the optical fibre module is typically stranded together with the electrical conductors of the cable. Fibre looseness introduces inaccuracies in the measurements, also in case the geometrical construction of the cable is known, as common manufacturing process tolerances (for example, for a polybutylene-terephthalate loose tube containing twelve SZ-stranded optical fibres) allow a measurement of length of the optical fibre of not more than about 0.5%. For example, in a 4 km-length cable accuracy in measurement can be of about 20 m, a value that in some applications can be unacceptable.

The Applicant has recognised that, if the electric cable is provided with an optical fibre unit arranged substantially along the neutral axis of the electric cable and mechanically coupled to the electric cable, it is possible to accurately measure the length of the electric cable by measuring the length of optical fibre comprised in the optical fibre unit by an optical backscattering technique.

In general terms and according to an aspect, the present invention relates to a method of measuring the length of an electric cable, the method comprising providing an electric cable having a cable length and including: a cable neutral axis, and a fibre unit longitudinally extending along the cable and including an optical fibre arranged substantially along the neutral axis, wherein the optical fibre is mechanically coupled with the cable. The method further comprises: injecting an optical signal into the optical fibre; detecting back-scattered light from the optical fibre responsive to said optical signal; analysing the detected back-scattered light as a function of time so as to determine the length of the optical fibre, and deriving the cable length from the length of the optical fibre.

By "neutral axis" it is meant a longitudinal axis of the cable which, upon cable bending, does not undergo elongation or compression strain.

In some preferred embodiments, by ensuring mechanical coupling, and in particular mechanical congruence, between the electric cable and the optical fibre of the cable-coupled optical fibre unit, movements and deformations, the latter caused for example by tensile loads, thermal stress and the like, of the electric cable during deployment and/or operation are at least partially transferred to the cable-coupled optical fibre thereby maintaining a substantially constant relationship between the cable length, $L_c$, and the length of the cable-coupled optical fibre, $L_f$. In particular, in the preferred embodiments, no length fluctuations of the cable-coupled optical fibre take place independently of the length variations of the electric cable.

With "mechanical congruence" it is meant the capacity of two or more parts of moving substantially as a whole, with the same geometrical elongation (positive or negative). Mechanical congruence between the cable-coupled optical fibre and the cable allows obtaining a cable capable of providing reliable assessment of its length by detecting the length of the cable-coupled optical fibre.

According to some preferred embodiments of the invention, the cable-coupled optical fibre unit is embedded in a mechanically-coupling filler, mechanically coupling the fibre unit with the longitudinal structural element of the cable.

By configuring the optical fibre unit according to the general teaching of the present invention, the measured length of the cable-coupled optical fibre substantially corresponds to the length of the electric cable. Fibre length can be determined by the OTDR with accuracy of about one meter for electric cables of length lower than 5 km.

Preferably, the cable-coupled optical fibre is surrounded by a protective sheath to improve mechanical resistance to lateral loads, said protective sheath directly contacting the optionally buffered optical fibre of the cable-coupled optical fibre unit. Preferably, the protective sheath comprises a fibre reinforced composite.

Preferably, the mechanically-coupling filler is based on an elastomer material, more preferably on a thermosetting elastomer.

Preferably, the method according to the invention employs OTDR or OFDR to measure the length of the cable-coupled optical fibre and thus to determine the length of the electric cable.

Within the present description, the term "longitudinal structural element" indicates a component of the electric cable, substantially longitudinally extending along the cable length, which bears the major portion of the cable load, thereby defining the neutral axis of the cable. Typically, in a cable consisting of insulated conductors, covered by one or more polymeric sheaths, the longitudinal structural element is the cable conductor (or, possibly, the assembly of cable conductors). In case one or more strength members are provided, in addition to the conductor or conductors, the longitudinal structural element is the assembly of such strength members and cable conductors, which define together the cable neutral axis.

The term "core" indicates a semi-finished structure of the electric cable comprising at least one electrical conductive element, such as an electrical conductor and, typically, at least one insulating layer surrounding the electrical conductor. In the typical configurations, the electrical conductors comprise a plurality of stranded conductive wires.

The method according to the present invention can be applied from low to high voltage electric cables.

BRIEF DESCRIPTION OF THE DRAWINGS

The present invention will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

FIG. 1 is a schematic cross-sectional view of the electric cable according to an embodiment of the invention.

FIG. 2a is a schematic perspective view of a cable-coupled optical fibre unit used in an electric cable of the present invention.

FIG. 2b is a schematic cross-sectional view of the cable-coupled optical fibre unit shown in FIG. 2a.

DETAILED DESCRIPTION

Figure 3:
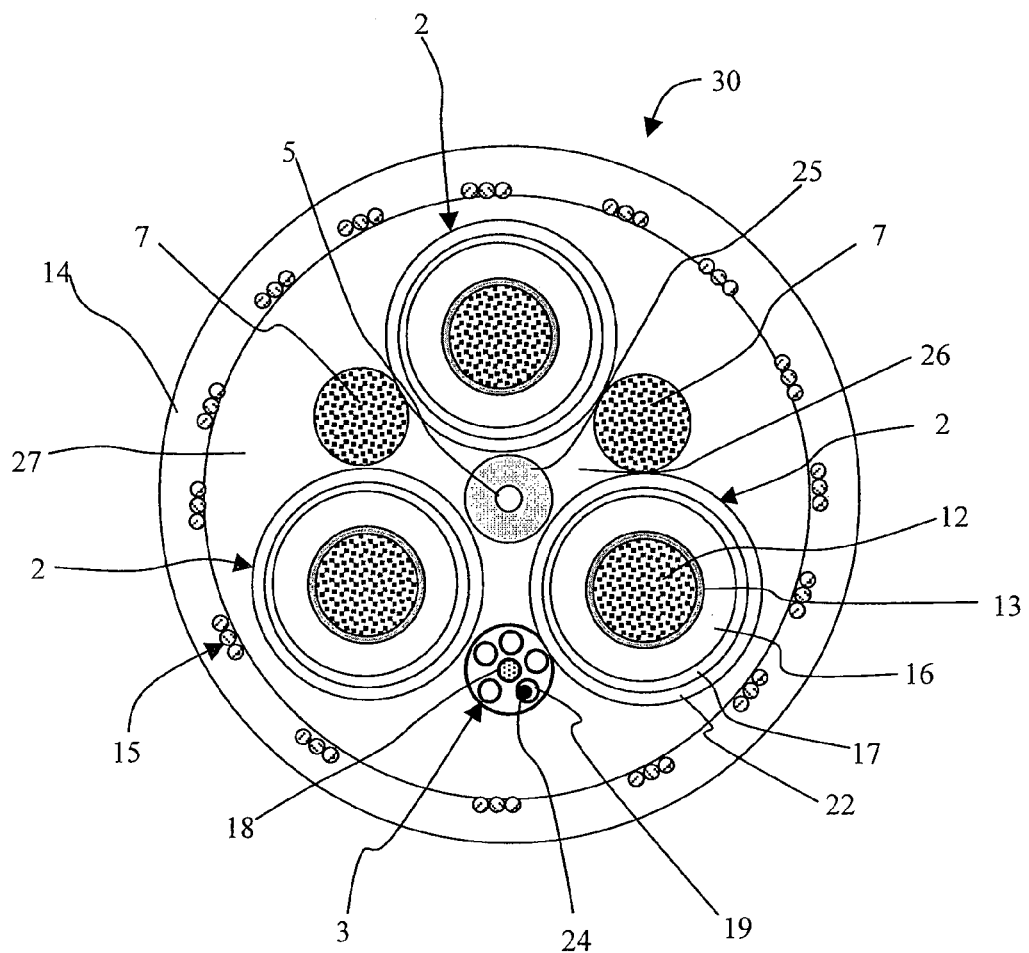
FIG. 3 is a schematic cross-sectional view of an electric cable, according to a further embodiment of the present invention.

FIG. 1 illustrates a cross-sectional view of an electric cable, according to an embodiment of the present invention. Cable 1 is a round cable comprising three cores 2 radially arranged about a central longitudinal axis Z of the cable. The cores 2 can provide three-phase power transmission. Cable 1 can be a low or medium voltage power cable, where low voltage indicates a voltage of up to 1 kV and medium voltage indicates a voltage of from 1 kV to 60 kV. Each core 2 comprises an electrical conductor 12, for example a copper conductor formed by a bundle of tinned or bare copper electrical wires stranded together according to conventional methods. In radial external position with respect to each electrical conductor 12, an inner semi-conductive layer 13, an insulating layer 16, and an outer semi-conductive layer 17 are sequentially provided. Inner semi-conductive layer 13, insulating layer 16 and outer semi-conductive layer 17 are made of polymeric-based materials that can be extruded one on top of the other or co-extruded onto the conductor 12. The insulating layer 16 can be for example of cross-linked ethylene propylene rubber (EPR); the inner and outer semi-conductive layers 12 and 17 can be, for example, EPR, ethylene/propylene/diene terpolymers (EPDM) or a mixture thereof, charged with a suitable amount of a conductive filler, which can be typically carbon black.

Alternatively, whenever the operating conditions enable to do so, both the insulating layer and semiconductive layers can be made of thermoplastic compounds, such as polypropylene based compounds.

In some applications, the cable core 2 comprises at least one metallic screen layer 22 in a radially external position with respect to the outer semi-conductive layer 17.

It is to be understood that the above description of cores 2 represents only one of the possible structures of the cores comprised in the electric cable, which in general can be phase cores for power transmission or grounding, cores for carrying control signals or cores carrying both power and control signals.

According to a feature of the invention, electric cable 1 comprises a cable-coupled optical fibre unit 5 arranged substantially along the central longitudinal axis Z of the electric cable, which is substantially the neutral axis of the cable. The cable-coupled optical fibre unit 5 is mechanically coupled with the longitudinal structural element in the cable, i.e. with the cores 2.

The cable-coupled optical fibre unit 5 is mechanically congruent with the longitudinal structural element in the cable in such a way that it remains in coaxial alignment with the central longitudinal axis and a substantially constant relationship between the cable length and the length of the cable-coupled optical fibre is maintained. To this end, in some preferred embodiments, the cable-coupled optical fibre unit 5 is embedded in a mechanically-coupling filler 6 that mechanically couples the cable-coupled optical fibre unit with the longitudinal structural element of the electric cable. Preferably, the mechanically-coupling filler mechanically couples the cable-coupled optical fibre unit with each of the circumferentially arranged cores integrated in the electric cable.

Further to cores 2 for transmission of power and/or control signals, the electric cable 1 comprises at least one earth conductor 7. In the embodiment shown in FIG. 1, the cable comprises two earth conductors 7, for example in form of a bundle of stranded tinned or bare copper electrical wires. Especially for medium-voltage applications, the bundle of electrical wires of the earth conductors can be surrounded by a semi-conductive layer (not shown in the figures). The earth conductors 7 are arranged radially external with respect to the cable-coupled optical fibre unit 5 and are stranded together with the cores 2 along a cable longitudinal direction. In particular, cores 2 and earth conductors 7 are helically wound about the central longitudinal axis Z of the cable, in accordance with conventional methods.

In the embodiment shown in FIG. 1, cable 1 comprises an optical fibre element 3 including a plurality of optical fibres, e.g., from 6 to 24 fibres, for transmission of control signals, voice, video and other data signals. A single optical fibre or a fibre pair can be inserted in a loose-tube buffer construction in longitudinally extending modules 19, preferably made of a flexible material such as polybutylene terephthalate (PBT) or ethylene tetrafluoroethylene (ETFE). In the illustrated example, the modules containing the fibres are SZ helically wound around a longitudinal strength member 18, being for example a glass fibre, an aramid filament or a carbon fibre. The optical fibre element 3 can be stranded together with the cores 2 and earth conductors 7. In general, if the cable construction allows it, the earth conductors and the optical fibre element can be arranged in the outer interstices formed by the cores 2.

Cores 2 and, if present, earth conductors 7 and/or the optical fibre element 3, are collectively referred to as the longitudinal structural element of the electric cable.

Since cable bending can induce an elongation in an optical fibre arranged within the electric cable, by arranging the optical fibre unit coaxial with the central longitudinal axis of the electric cable, the optical fibre unit is not damaged by bending of the cable to any radius of curvature being not smaller than the minimum radius of curvature, $\rho_{min}$, which corresponds to the minimum radius at which the cable can be bent without permanent damage. It has been observed that the cable-coupled optical fibre unit is generally undamaged by cable bending at radii of curvature not smaller than $\rho_{min}$ when the longitudinal strain induced by bending is smaller than the strain applied to the fibre in a strain test of typically 1 or 2%. Values of $\rho_{min}$ specified for heavy-duty cables, especially for applications in mobile equipments, can be relatively low, e.g., 250 mm. In order to improve bending resistance of the cable-coupled optical fibre, preferably the cable-coupled optical fibre is arranged within a relatively small radial distance from the central longitudinal axis of the electric cable, e.g., not greater than 5 mm.

In some preferred embodiments, the cable-coupled optical fibre is disposed along the cable length within a distance from the neutral axis of not more than $0.02\rho_{min}$ and preferably of not more than $0.01\rho_{min}$.

Preferably, the cable-coupled optical fibre is disposed along the cable length within a distance from the neutral axis which must be as small as possible, taking into account the cable size, the minimum cable bending radius (either on a reel or when deployed in the field) and the accuracy required for the length measurement. By way of example, a displacement from the neutral axis of less than 5 mm is acceptable for most applications.

Preferably, the contact between mechanically-coupling filler and the at least one longitudinal structural element should show no significant sliding at least in strained condition. In many cases of interest, a substantial absence of sliding between optical fibre unit and the element(s) implies an adherence with friction or bonding between them. A mechanical coupling between two elements causing substantially the same deformation as a result of no significant sliding between the elements, is herein referred to as mechanical congruence.

In the embodiment illustrated in FIG. 1, the geometrical configuration of the mechanically-coupling filler 6 is such that the filler contact a plurality of longitudinal structural elements positioned in radial external position with respect to the cable-coupled optical fibre unit 5, also when the cable is in a substantially unstrained condition.

From the geometrical construction of the electric cable and the number of longitudinal structural elements integrated in the cable, the mechanically-coupling filler 6 of FIG. 1 has a shape approximately of a trefoil.

Preferably, the mechanically-coupling filler 6 is made of a material having elastic properties such to react to the maximum strain for which the cable exhibits an elastic behaviour without permanent deformation of the filler (i.e., reversibility of the deformation). The mechanically-coupling filler material is selected to suitably stretch along the cable undergoing elongation and to substantially recover the deformation when the external tensile loads are removed, at least for tensile loads corresponding to the allowed maximum strain, beyond which a permanent and irreversible deformation of the cable takes place.

The mechanically-coupling filler 6 can be based on a polymeric material, advantageously extruded around the cable-coupled optical fibre unit 5. Thermosetting elastomers having an elastic behaviour within a relatively large range of strain, e.g., exceeding 1%, were found to be particularly suitable for the cable of the invention. Advantageously, thermosetting elastomers are observed to adhere with high friction to the surfaces of the longitudinal structural elements. For example, it has been noted that thermosetting elastomers provide a strong adhesion with the semi-conductive materials that typically surround the cores of some electric cables, while exhibiting a friction not detrimental for the semi-conductive external surface of the cores. A reliable strain transfer having a predicable or at least derivable relationship between the strain experienced in a longitudinal structural element of the cable and the strain measured in the sensor was observed to occur.

Advantageously, the material of the mechanically-coupling filler is resistant to thermal treatments that may take place during cable manufacturing, such as during curing of the outer sheath of the electric cable, typically carried out at approximately 200° C.

Preferably, the mechanically-coupling filler comprises a thermosetting elastomer cross-linked by means of steam pressure, irradiation with electron beam, salt bath dipping or silane cross-linking systems. In general, the mechanically-coupling filler is preferably made of elastomers having an elastic modulus between 0.01 and 0.7 GPa. For example, the mechanically-coupling filler is selected from the group consisting of ethylene propylene diene rubber (EPDM), ethylene propylene rubber (EPR), nitrile-butadiene rubber (NBR).

Although thermosetting elastomers are preferred because of their temperature resistance adhesion properties and large elasticity range, the use of thermoplastic elastomers is not excluded. Examples of thermoplastic elastomers include styrene-diene-styrene triblock copolymers; thermoplastic polyester elastomers and thermoplastic polyurethane elastomers; and thermoplastic polyolefin rubbers (polyolefin blends).

In some embodiments, the mechanically-coupling filler 6 can be electrically conductive.

Interstitial areas 11 are filled with polymeric filler such as an EPR based compound. An outer jacket 14 is provided, for example by extrusion. To increase the resistance of the electric cable to mechanical stresses, the outer jacket 14 is preferably made of a cured polymeric material, preferably based on a reinforced heavy-duty thermosetting elastomer, such as high density polyethylene (HDPE), polychloroprene, polyurethane or NBR-based compound.

Optionally, to increase the torsion resistance of the electric cable, an armour 15 in form, for example, of braids or double spiral of reinforcing yarns, such as metal or polyester yarns, for instance made of Kevlar® (aromatic polyamide), is provided.

FIGS. 2a and 2b illustrate a partial perspective view and a cross-section, respectively, of a cable-coupled optical fibre unit 5 integrated in the electric cable of FIG. 1, according to a preferred embodiment of the present invention. The cable-coupled optical fibre unit 5 comprises an optical fibre 9 that is substantially arranged along the longitudinal axis Z, that is the neutral axis of the cable, when the cable-coupled optical fibre unit is integrated in the cable. Fibre 9 of cable-coupled optical fibre unit 5 is an optical fibre, namely a silica-based optical fibre, with typical nominal diameter of 125 μm, coated by a primary coating, which is surrounded by a secondary coating, which typically adherently contacts the primary coating, where the primary and secondary coating form a coating system. The outer diameter of the (coated) optical fibre can be 250+/−10 μm or 200+/−10 μm. Single-layer coating systems can be used as well. Preferably, the optical fibre 9 is a single-mode optical fibre, although a multimode optical fibre can be used as well.

In some embodiments, where the method is for measuring the length of a heavy-duty cable, the optical fibre of the cable-coupled optical fibre unit has enhanced bending performance, exhibiting low bending losses. In some embodiments, the optical fibre is compliant to the G.657 ITU-T recommendations.

In one embodiment, the coating system of the cable-coupled fibre is coated with a coating system as disclosed in. EP 1 497 686, which was observed to provide the optical fibre with no rupture when subject to repeated elongations exceeding 2%.

In some preferred embodiments, the optical fibre 9 is tight-buffered with a buffer layer 10 surrounding the coating system for improving mechanical protection of the optical fibre, e.g. against microbending losses. The Applicant has understood that uniform adherence of the buffer layer to the optical fibre, namely to the coating system of the fibre, is particularly important for ensuring mechanical congruence between the optical fibre and the mechanically-coupling filler.

For example, the buffer layer 10 is extruded or applied over the 250 μm-coated fibre, increasing the outside diameter up to 600-1000 µm, with typical values of 800-900 µm. Preferably, the buffer layer is made of a material having elastic properties that permit the tight-buffered optical fibre to bear elongations of up to and including 2%.

Advantageously, the buffer layer is selected so as to adhere to the coating system of the optical fibre with essentially no creeping, slipping or debonding. Preferably, the buffer layer is based on a thermal resistant material capable of exhibiting thermal resistance sufficient to withstand the thermal treatments taking place during cable manufacturing.

Preferably, the buffer layer is made of a radiation curable acrylate polymer.

For example, the tight buffer is made of a UV-curable acrylate polymer such that described in WO 2005/035461, or of a polymeric matrix charged with a flame retardant filler such that described in WO 2008/037291.

An adhesion-promoting layer can be provided between the optical fibre coating system and the tight buffer layer.

A protective sheath 8, designed to improve resistance to lateral compressions, can be advantageously provided to surround the optionally tight buffered optical fibre of FIGS. 2a and 2b.

In round cables, such as that illustrated in FIG. 1, lateral compressions in directions transverse to the longitudinal cable direction, typically occur in radially inward directions.

The cable-coupled optical fibre unit can be used as pulling strength member in the step of extrusion of the mechanically-coupling filler during the cable manufacturing process. To this end, it has been observed that is important that the cable-coupled optical fibre unit material does not soften during the extrusion process of the mechanically-coupling filler, in order to guarantee a uniform pulling force. The presence of a protective sheath 8 and a suitable selection of the material forming said sheath can advantageously provide the cable-coupled optical fibre unit with a tensional strength sufficient to both improve resistance to lateral compression and to allow the cable-coupled optical fibre unit to function as pulling strength member in the manufacturing process of the electric cable.

When mechanical congruence between the optical fibre and the mechanically-coupling filler is desired, the material of the protective sheath is preferably selected so as to provide strong and relatively uniform adhesion with the optionally buffered optical fibre.

Preferably, the protective sheath 8 is made of a fibre-reinforced composite, wherein the fibres can be carbon, graphite, boron, or glass (non optical) fibres. In an embodiment, the protective sheath 8 is a glass-reinforced polymer (GRP), in which the polymer is reinforced by glass fibres embedded in the polymer. It has been observed that advantageously relatively high tensional stiffness of the cable-coupled optical fibre unit is achieved by the presence of reinforcing fibres deployed parallel to the optical fibre longitudinal axis, thereby preventing lateral compression to be misread as tensile strain. The protective sheath 8 can be pultruded onto the buffer layer 10 and is in direct contact thereto. Preferably, the polymer embedding the reinforcing fibres are cross-linked resins, in particular UV-curable cross linked resins or thermosetting cross linked resins, which in general provide for a resistance to compressions. The cross-linked resins can be unsaturated polyesters, epoxies, or vinyl esters.

Optionally, the outer surface of the protective sheath, which is surrounded by the mechanically-coupling filler in which the cable-coupled optical fibre unit is embedded, comprises a plurality of grooves or cuts or is treated to form a rough surface in order to increase the adherence of the protective sheath with the mechanically-coupling filler. Alternatively or in addition, an adhesion promoting layer can be optionally provided on the protective sheath.

To improve flexibility of the cable-coupled optical fibre unit, the thickness of the protective sheath, when made of polymeric-based material, is preferably comprised between 500 and 1000 µm. For example, the protective sheath is a GRP layer that increases the outer diameter of the buffered optical fibre up to 1.8-2.5 mm.

It is preferred that the protective sheath surrounding the optical fibre of the sensor prevents fibre shrinkage at temperatures used in the manufacturing process, and in particular in the curing process of some cable components, such as the inner and outer sheaths. High-temperature grade cross-linked resins withstanding the curing temperature are selected, for example, high temperature Polystal® GRP by Polystal Composites GmbH.

In above described preferred embodiments, the cable-coupled optical fibre unit comprises an optical fibre covered by layers (i.e., tight buffer, protective sheath) exhibiting elastic properties and embedded in a mechanically-coupling filler with elastic properties. However, as long as the structure composed by the cable-coupled optical fibre unit and the mechanically-coupling filler is capable of recovering the elongation in the reversible elastic regime of the cable, at least one of the layers selected from the group consisting of the buffer layer surrounding the coated fibre, the protective sheath and the mechanically-coupling filler can exhibit a non-elastic behaviour and in particular a plastic behaviour. In particular, the at least one layer can be made of a plastic material, namely a material having the capability to deform in response to mechanical forces without fracture, at least until a certain threshold value of the external forces is not exceeded. In general terms, elastic response is obtained if: (1) a layer made of substantially plastic material is congruent with at least one layer made of elastic material, and (2) the axial rigidity of the layer made of plastic material is smaller than the axial rigidity of the at least one layer made of elastic material to which the layer of plastic material is in contact with. The axial rigidity, typically measured in N, is the product of the Young's modulus and the cross-sectional area of the layer element. In this way, the layer made of substantially plastic material stretches along the elastic material on which it adheres or contacts with friction during cable elongation and is pulled back to its original position by the elastic material, provided that enough gripping force exists between the two layers.

For example, the protective sheath of the cable-coupled optical fibre unit is a fibre reinforced thermoplastic polymer having Young's modulus of 72,400 MPa, while the mechanically-coupling filler is a thermosetting elastomer having Young's modulus of 671 MPa. The cross-sectional area of the protective sheath is of 3.4 mm$^2$ and the cross-sectional area of the mechanically-coupling filler is of 75 mm$^2$, providing an axial rigidity of 250 kN for the protective sheath of and of 50 kN for the mechanically-coupling filler. If a fibre reinforced thermoplastic polymer has a good adhesion to the strain transferring filler and to the underlying layers, such as the buffer layer, the thermoplastic polymer takes along the mechanically-coupling filler, even if the cross-sectional area thereof is much smaller. It is to be noted that this would be true also if the mechanically-coupling filler is made of a thermoplastic polymer, provided that the above conditions (1) and (2) are satisfied, and where the layer with elastic properties is the buffer layer surrounded by the protective sheath.

In an embodiment, under the assumption that conditions (1) and (2) are fulfilled, the mechanically-coupling filler is selected from the group consisting of: polyester with Young's modulus of from 1 to 5 GPa, polyimide with Young's modulus of from 2 to 4 GPa, polyvinyl chloride (PVC) with Young's modulus of from 0.003 to 0.01 GPa, low-density polyethylene with Young's modulus of from 0.1 to 0.3 GPa, and high-density polyethylene with Young's modulus of from 0.4 to 1.2 GPa. Preferably, cross-linked polymeric materials are employed.

According to another embodiment, in order to provide the cable-coupled optical fibre unit with improved resistance to lateral loads and pulling strength, the protective sheath of the cable-coupled optical fibre unit can be a metallic tube surrounding the buffer layer of the optionally buffered optical fibre (embodiment not shown in the figures). In this case, the metallic tube contains a gel or gel-like material, optionally under pressure, capable of providing the sought mechanical congruence between metallic tube and the optical fibre contained therein. In a preferred embodiment, the metallic tube is made of steel.

Preferably, only one in the group consisting of the buffer layer surrounding the coated fibre, the protective sheath and the mechanically-coupling filler is made of a material with plastic properties.

Although in some preferred embodiments the cable-coupled optical fibre unit comprises a buffer layer in order to improve strength and elasticity of the cable-coupled optical fibre unit, as in the construction shown in FIGS. 2a and 2b, it is to be understood that the cable-coupled optical fibre unit can comprise an optical fibre coated with a coating system directly surrounded by a protective sheath.

The electric cable 1 may comprise a temperature sensor comprising an optical fibre 24 for measuring the internal temperature of the cable 1. The optical fibre 24 of the temperature sensor is in a loose buffer construction. In particular, in the embodiment illustrated in the figure, optical fibre 24 placed loosely inside a module 19 longitudinally enclosing the fibre, the module 19 being comprised in fibre optic element 3. The longitudinally extending module 19 contains excess optical fibre length per unit length of the tube optical fibre 24. The excess fibre length (EFL) is defined by the following relationship:

$$EFL = \frac{L_T - L_m}{L_T} \cdot 100 \quad (1)$$

wherein $L_T$ is the length of the optical fibre 24 and $L_m$ is the length of the tube housing the fibre.

The optical fibre 24 of the temperature sensor may be a single-mode fibre and temperature is measured by using Brillouin backscattering techniques. However, use of a multi-mode optical fibre can be envisaged for temperature detection. In the latter case, temperature measurement can be carried out by using known techniques based on Raman scattering. In the embodiment of FIG. 1, the optical fibre 24 is helically wound with respect to a central longitudinal axis extending along the cable. For example, optical fibre 24 is twisted around a longitudinal member. In case of an electric cable comprising an optical fibre element comprising more than one optical fibre, two fibres can be helically wound around each other along a longitudinal direction, one of the two fibres being employed as optical fibre of the temperature sensor.

Mechanical coupling, and in particular mechanical congruence, between the cable-coupled optical fibre unit and the cable may take place only when at least one of the longitudinal structural elements is subject to a tensile load and becomes in contact with the mechanically-coupling filler. For instance, mechanical coupling occurs when longitudinal structural elements undergo tensile loads corresponding to elongations of at least 0.1%.

FIG. 3 is a cross-sectional view of an electric cable, according to a further embodiment of the present invention. Same numbers are used to identify like components having the same or similar functions to the elements of FIG. 1. While the embodiment in FIG. 1 includes a mechanically-coupling filler contacting the longitudinal structural elements of the cable also in the absence of tensile loads, in the embodiment shown in FIG. 3, the strain transferring filler does not contact, at least non completely, the surface of the longitudinal structural elements when the cable is in a substantially unstrained condition, e.g., the original condition of the cable, before installation or use in a mobile equipment. In particular, electric cable 30 comprises a cable-coupled optical fibre unit 5 surrounded by a mechanically-coupling filler 25, which is preferably directly extruded over the cable-coupled optical fibre unit, e.g., with reference to FIGS. 2a and 2b, onto the outer surface of the protective sheath 8. The mechanically-coupling filler 25 may have a circular cross-section. For example, protective sheath 25 has a thickness of from 2 to 7 mm. The interstitial space 26 between the mechanically-coupling filler 25 and the radially external longitudinal structural elements, namely cores 2, and, if present, earth conductors 7 and optical fibre element 3, can be filled by the same material of the polymeric filler 27 surrounding the longitudinal structural elements, for example an EPR-based compound.

Because of the size thereof, the cable-coupled optical fibre unit 5 buffered with the mechanically-coupling filler 25 is relatively free to move in the interstitial space 26 between the mechanically-coupling filler 25 and the cable longitudinal structural elements, the mobility of the cable-coupled optical fibre unit depending also on the viscosity of the material filling the interstitial space. The cable is configured in such a way that the extent of the mobility of the fibre unit within the cable does not affect the accuracy of the length measurement. Upon the application of a tensile force, the longitudinal structural elements tend to compress radially inwardly, thereby reducing the radial distance to the longitudinal axis along which the cable-coupled optical fibre unit is arranged. When the value of the tensile force experienced by the cable is above a certain threshold, the longitudinal structural elements are pressed radially inwardly and establish contact with the mechanically-coupling filler 25. On the contrary, when the cable elongates in any longitudinal position of the cable length below that threshold, the optical fibre of the cable-coupled optical fibre unit 5 follows the cable movement with a delay due to the relatively poor grip with the longitudinal structural elements of the cable. Preferably, the threshold in the tensile force is of 0.1%.

The material properties of the mechanically-coupling filler 25 are those described above with reference to FIG. 1.

Figure 4:
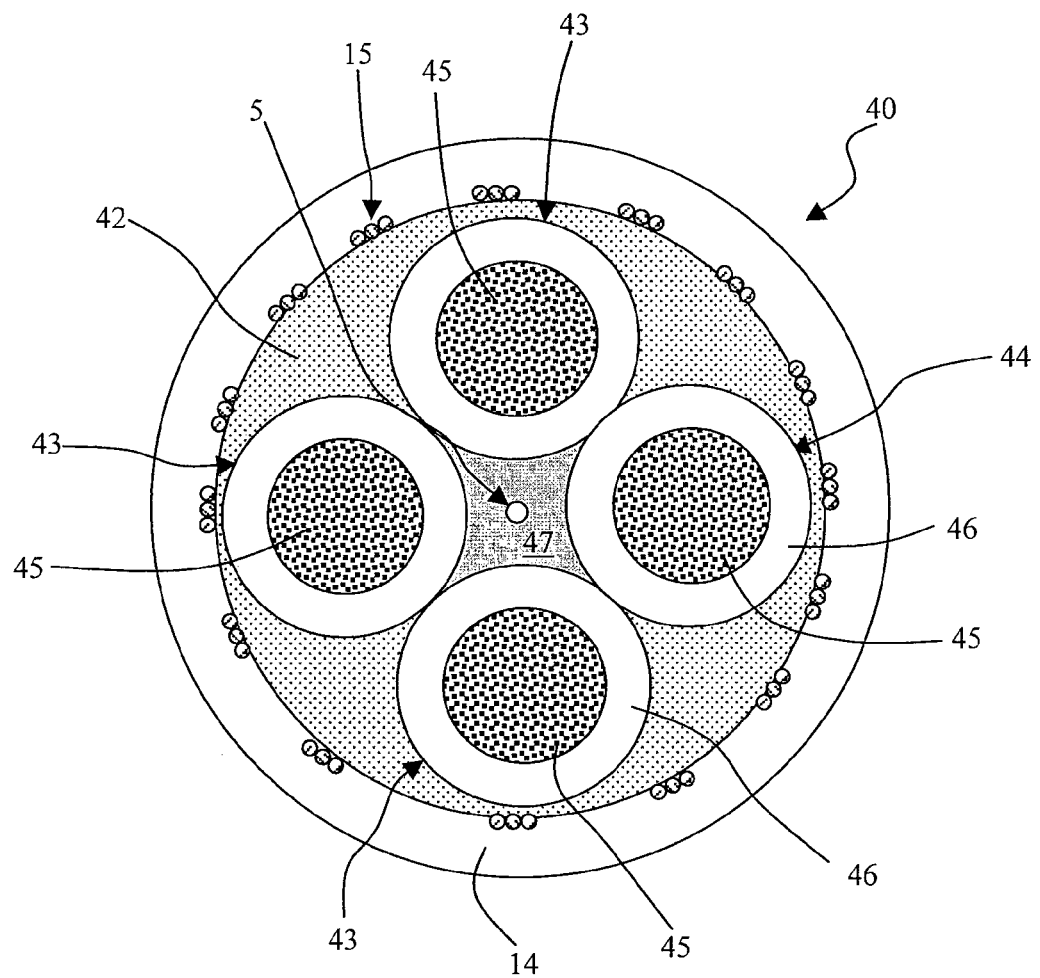
FIG. 4 is a schematic cross-sectional view of an electric cable, according to still another embodiment of the present invention.

FIG. 4 is a cross-sectional view of an electric cable, according to a further embodiment of the present invention. Same numbers are used to identify like components having the same or similar functions to the elements of FIG. 1. Electric cable 40 comprises four longitudinal structural elements, namely three power cores 43 and an earth conductor 44, being arranged radially external with respect to the cable-coupled optical fibre unit 5, which can have the construction described with reference to FIGS. 2a and 2b. Power cores 43 and earth conductor 44 comprise each a conductor 45, for example in form of a bundle of stranded tinned or bare copper electrical wires, surrounded by an insulating polymeric layer 46. The mechanically-coupling filler 47 embeds the cable-coupled optical fibre unit 5 and fills the interstices between the cable-coupled optical fibre unit and the longitudinal structural elements. Properties and geometrical shape of the mechanically-coupling filler 47 are such that mechanical coupling, and in particular mechanical congruence, exists between the longitudinal structural elements 43 and 44 and the cable-coupled optical fibre unit 5, also in an unstrained condition of the cable. Cable 40 can be a 1 kV power cable, such as for vertical reeling applications.

Figure 5:
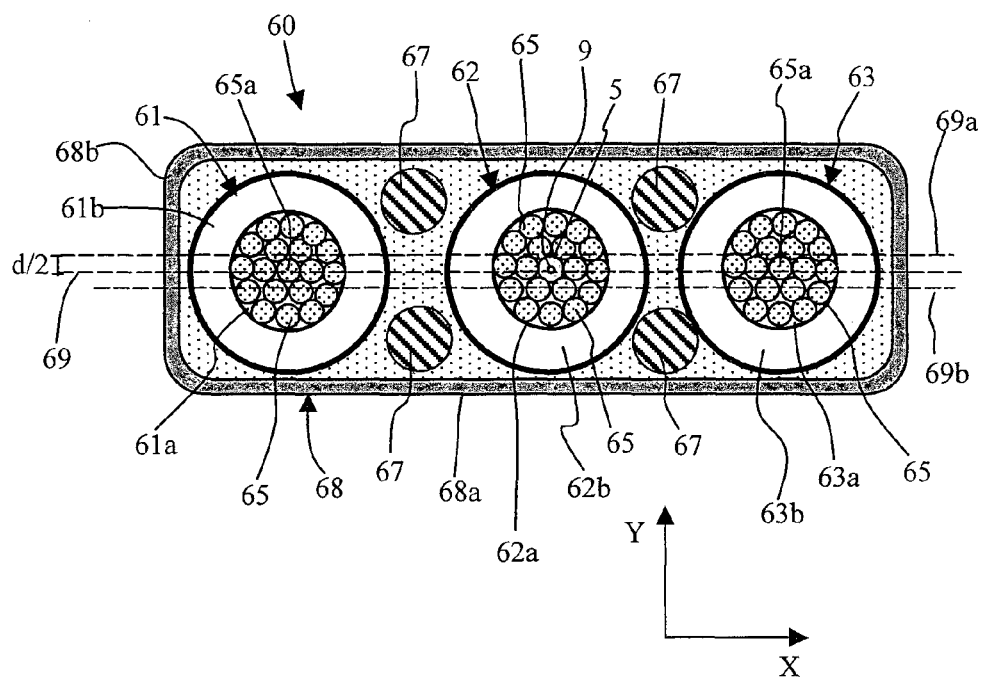
FIG. 5 is a schematic cross-sectional view of an electric flat cable, according to a further embodiment of the present invention.

FIG. 5 shows a schematic cross-sectional view of a three-phase electric flat cable 60, such as for applications in well pump systems, including two outer cores 61 and 63 and a central core 62. Each core 61, 62 and 63 comprises a respective electrical conductor 61a, 62a and 63a, each electrical conductor being preferably surrounded by a respective semi-conductive or insulating layer 61b, 62b and 63b. The cores are positioned substantially parallel and adjacent one to another, centred along a common axis 69 parallel to the X direction, transversal to the longitudinal cable axis. In the embodiment of FIG. 5, the axis 69 is the middle line of the cable cross-section in the plane (X,Y). A cable-coupled optical fibre unit 5 comprising an optical fibre 9 is arranged within the central core 62, in particular along the central longitudinal axis of the electrical conductor 62a. A plurality of wires 65 are wrapped helically around the optical fibre unit 5 through stranding process generally known in the art of wire stranding. The cable-coupled optical fibre unit 5 can have the structure described with reference to FIGS. 2a and 2b. A mechanically-coupling filler is not mandatory in the present cable construction because of the compactness of the wires stranding about the optical fibre unit. The electrical conductors 61a and 63a can comprise a bundle of a plurality of wires 65, e.g. 6, 12 or 18, wrapped helically around a central wire 65a, which can have the cross-section area of the surrounding ones.

In some embodiments, the core 62 is arranged in such a way that the central longitudinal axis of core, along which the optical fibre unit 5 is disposed, crosses the middle axis 69, since it is the axis of symmetry of the cable cross-section along the Y axis and a neutral axis of cable 60. The cable-coupled optical fibre unit 5 is arranged within the neutral region for bending of thickness d, defined between two planes 69a and 69b parallel to the middle line 69, each being distant d/2 from 69 in the Y axis. For flat cables with typical values of $\rho_{min}$ of 500 mm, the thickness d can range from 5 to 10 mm.

The flat cable 60 further comprises outer armour 68 arranged in an external position with respect to the cores and longitudinally enclosing them. The outer armour 68 has two substantially flat sides 68a parallel to the X axis and two opposite lateral sides 68b surrounding a portion of two outer cores 61 and 63. The outer armour 68 is preferably a tape armour of steel or of stainless steel or of a copper and nickel alloy.

The electric cable 60 has a plurality of interstitial spaces 65, which are defined by the spaces between the cores and the outer armour 68. Strength members 67 are arranged in interstitial spaces between the outer cores and the central core, in two common planes parallel to the X-axis. The strength members 67 have circular cross-section and can be made of steel, glass or reinforced polymers.

The free space between the cores and the strength members is filled with an inner sheath 64, made for instance of mineral filler charged polymeric compound, preferably extruded directly on the longitudinal structural elements of the flat cable.

A cable comprising a single conductor (not illustrated) can include a cable-coupled optical fibre unit according to the invention in an arrangement similar to that illustrated for the core 62 of FIG. 5. Such a type of cable typically has an overall circular cross-section.

According to an aspect, the present invention relates to an electric cable comprising:
  a cable core comprising a plurality of stranded conducting wires,
  a cable neutral axis, and
  a cable-coupled optical fibre unit longitudinally extending along the cable and including a cable-coupled optical fibre arranged substantially along the neutral axis, wherein the cable-coupled optical fibre is mechanically coupled with the cable;
wherein:
  the plurality of wires are stranded around the optical fibre unit;
  the cable-coupled optical fibre unit is mechanically coupled with at least one of the plurality of wires.

At least part of the plurality of wires directly surrounds the cable-coupled optical fibre unit. Preferably, the optical fibre unit is mechanically coupled with the at least part of the plurality of wires directly surrounding the optical fibre unit.

According to a feature of the present invention, electric cables according to the invention are monitored to determine the cable length by using optical backscattering techniques, such as optical time domain reflectometry (OTDR), photon counting optical time domain reflectometry or optical frequency domain reflectometry (OFDR). According to the generally known measurement techniques, an optical signal (probe) generated by a laser is launched into a first end of the optical fibre integrated in the electric cable. In OTDR the probe optical signal is a pulsed wave signal, in OFDR it is a continuous wave modulated in frequency. The return optical signal backscattered from the optical fibre is measured by a detection circuit.

In case a fibre loop is formed by joining a first optical fibre with a second optical fibre, the optical signal is launched into the first optical fibre and the cable length is determined by the length of the first optical fibre measured up to the connector or splice with the second optical fibre, subtracting the pigtail length used for the optical fibre splice.

In the OTDR, a measurement of the portion of light reflected back from the fibre as a function of time of arrival of the light is performed to produce an OTDR trace made by the measured optical power of the detected back-reflected light signal vs. time. The OTDR trace is determined by the light back reflected and guided back into the fibre caused by Rayleigh scattering occurring in the fibre glass material due to its inhomogeneities and Fresnel reflection occurring at interfaces with different refractive index materials (like air) which appear in the OTDR trace as a discontinuity in the measured optical power. By comparing the amount of light scattered back at different times, the OTDR can determine fibre and connection positions along the fibre and losses. If a second fibre end, opposite to the first fibre end, has a face that is cut sharply orthogonally to the fibre longitudinal axis, a strong reflection occurs at a cable position corresponding to that second fibre end and a peak is visible in the OTDR trace. A fibre end face orthogonal to the fibre axis can be achieved by means of a commercially available fibre cleaver.

The time between pulse launch and receipt of the backscattered pulse is proportional to the distance along the fibre to the source of the backscattering. The time T required by the laser pulse to travel the fibre length $L_f$ in the forward direction and return back to the injection point of the pulse into the fibre (e.g. first fibre end) is described by the following equation:

$$2L_f/T = c/n_{\text{eff}} \quad (2)$$

where c is the speed of light in vacuum ($2.99792458 \times 10^8$ m/s) and $n_{\text{eff}}$ is the group refractive index of the optical fibre. The group refractive index $n_{\text{eff}}$ is the ratio of the speed of light in vacuum to the speed of light in the fibre for a pulse of light at a given frequency (or wavelength). In many cases of interest, the uncertainty of $n_{\text{eff}}$ is the main factor determining the length accuracy, since $n_{\text{eff}}$ is usually quoted to 1 in $10^3$ (i.e. 3 digits) while the best available measurements are 1 in $10^4$ (i.e. 4 digits). The value of $n_{\text{eff}}$ for the cable-coupled optical fibre is determined by using Eq. (1) on a calibration optical fibre made of the same type, possibly drawn from the same preform, and of known fibre length.

In optical frequency-domain reflectometry (OFDR) with the frequency scanning (OFDR-FS), a signal injected into a fibre is a continuous frequency modulated optical wave (not a pulse like in OTDR). The optical radiation generated by highly coherent laser diode is slowly and linearly swept around the central frequency and coupled into a Michelson fibre interferometer. The reference arm is terminated by a mirror and the test arm is coupled to the fiber under test. The time delay between the signals from the reflector in reference arm and the backscattered signal from an arbitrary element dx at position x in test arm is $\tau = 2 x/v_g$, where $v_g$ is the group velocity in the fiber core. For the coherent detection the both signals are mixed at the detector. During the time delay $\tau$ the linearly swept optical frequency changes by $\Omega = \tau[d\omega/dt]$. This subtraction frequency component can be observed in the detector signal using the optical spectrum analyzer. Its frequency $\Omega$ determines the position x on the fiber and its amplitude is proportional to the local back scattering coefficient and optical power, which is proportional to the factor $\exp(-2ax)$ and describing the forward and backward signal attenuation on the distance x. Performing the Fourier transform of the detector signal in a low frequency spectrum analyzer one can simultaneously observe the back scattered waves from all points along the fiber under test. They correspond directly to the frequency axes $\Omega$ of the analyzer.

Figure 6:
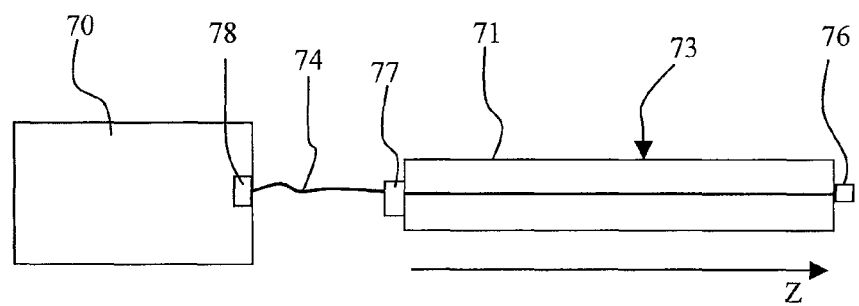
FIG. 6 is a schematic diagram for illustrating the operating principles of an optical backscattering technique in an electric cable according to an embodiment of the invention.

FIG. 6 is a schematic block diagram illustrating a length measurement system using an OTDR-based backscattering technique, according to an embodiment of the invention. A sampling apparatus 70 is used to inject optical signals in an electric cable 73 and to analyse the backscattered optical signal received from the cable. To this purpose the sampling apparatus comprises an optical source, such as a laser, and a detection circuit apt to detect the scattered light signal. For example, the sampling apparatus is an E8136MR SM OTDR module commercialised by JDSU.

The electric cable 73 comprises a cable-coupled optical fibre unit 71 in tight mechanical coupling with at least one longitudinal structural element, extending along the cable longitudinal direction Z (only the cable-coupled optical fibre is schematically represented in the figure). The electric cable 73, and in particular the arrangement of optical fibre 71 within the cable, may have a structure as any of those described in the foregoing embodiments. The cable-coupled optical fibre unit 71 is located along the central longitudinal axis of the cable and has mechanical congruence with at least one longitudinal structural elements of the cable.

The sampling apparatus 70 launches an optical signal from an output 78 to an optical cable section 74, i.e. the "launch cable", comprising a "launch" optical fibre connected to a proximal end of the optical fibre 71. The terms "proximal" and "distal" for the fibre ends are referred with respect to the sampling apparatus, or, at least to the optical connection with the sampling apparatus. However, such terms are intended to indicate only a relative position and/or are used to facilitate the description of the drawings, but they are not to be construed as having an absolute meaning. Non-permanent connection between the cable section 74 of the measurement apparatus 70 to the optical fibre 71 can be made by conventional means, for instance through an optical connector 77, e.g. a splice connector.

The presence of an optical connector is seen by the travelling light as a discontinuity that produces a modification of the OTDR trace. In particular, the optical connector 77 determines a change of the OTDR trace, such as a peak in the back-reflected optical power. An optical connector 76 is placed at the distal end of the optical fibre 71. A splice connector can be used to optically couple the cable-coupled optical fibre to a further optical fibre (not shown) arranged in a loose buffer construction, which can be employed for temperature measurement. In such an embodiment, the optical fibre 71 and the further optical fibre are jointed in a loop. A fusion splice between the two fibres is recorded in the OTDR trace as a perturbation, in general as a sharp decrease of the optical power of the reflected light signal.

Alternatively, the distal end of the optical fibre 71 can be cleaved so as to form a sharp end cut orthogonally the fibre longitudinal axis. Either the presence of the connector 76 at the distal end of the cable-coupled fibre or of a cleaved end of the fibre generates a change of the OTDR trace, such as an optical power peak due to the light reflection from the distal end face. It is to be noted that angled non-orthogonal cleaved end faces can be used as end faces of the fibre, although angled end faces generally give raise of weaker reflection light signals compared to orthogonal end faces. The distance between the optical power peaks generated by the optical connectors 77 and 76 gives the fibre length. More generally, the distance between by the discontinuities in the OTDR trace at the end faces of the cable-coupled optical fibre provides the fibre length, $L_f$. By configuring the optical fibre unit according to the teaching of the present invention, the measured length of the cable-coupled optical fibre corresponds to the length of the electric cable. Fibre length can be determined by the OTDR with accuracy of about one meter for electric cables of length lower than 5 km, in particular of from 0.1 km to 100 km.

The sampling apparatus 70 detects and analyses the OTDR trace as a function of the distance from the proximal end of the launch optical fibre 74 to the distal end of the cable-coupled optical fibre 71. Within the analysis of the trace, the sampling apparatus records the distance between two or more recognized events, detected as perturbation of the linear evolution of the trace. Event localization and determination of their nature (e.g., splice, connector, fibre cracks, bending, fibre end) can be implemented as an automatic tool in the sampling apparatus.

Figure 7:
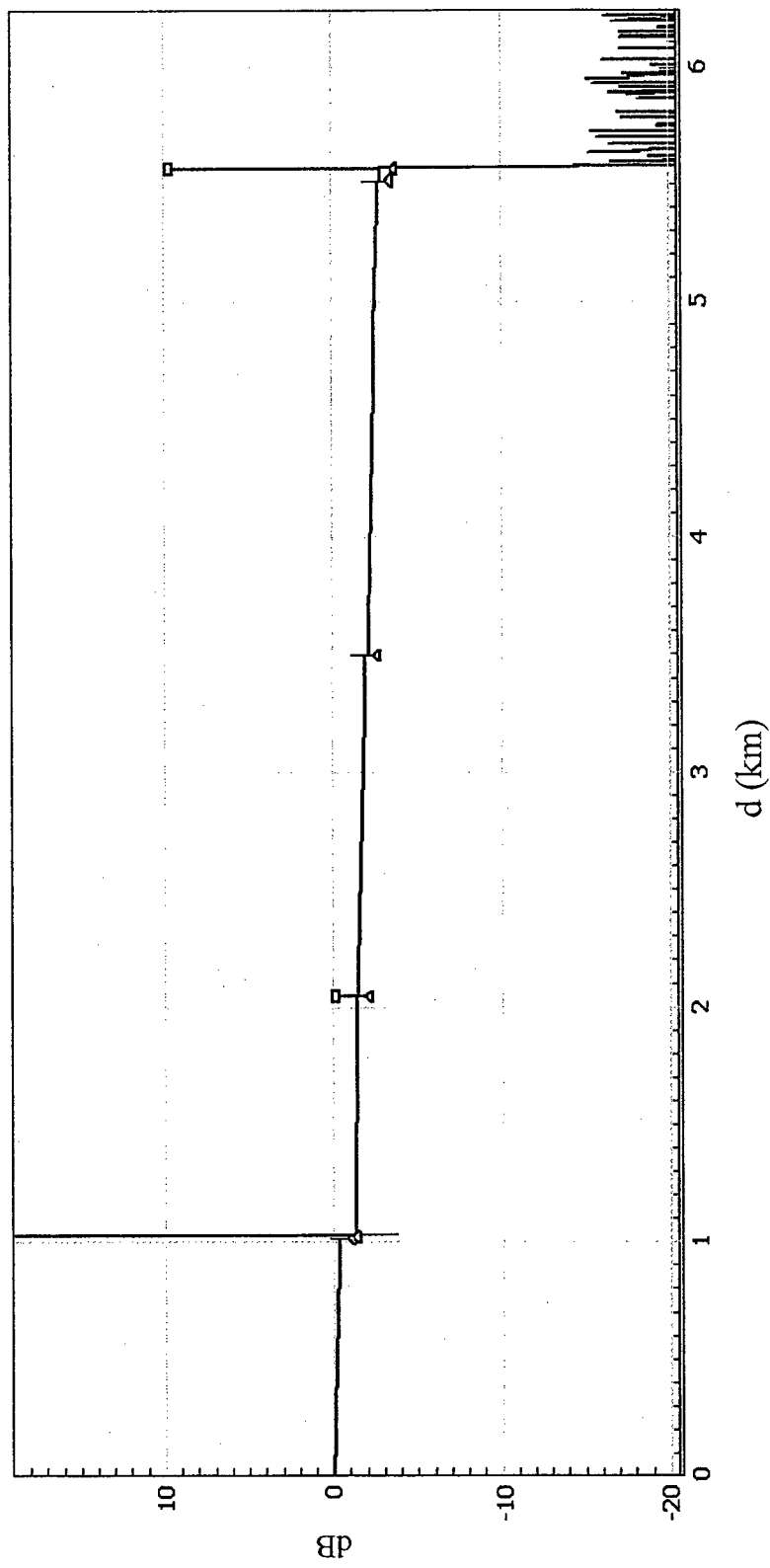
FIG. 7 is a graph of an exemplary OTDR trace measured by the method according to an embodiment of the present invention.

FIG. 7 is a graph of an exemplary measurement of the OTDR trace in an electric cable according to an embodiment of the invention. In abscissa, the time of detection of the returned reflected light has been converted in distance, d (in km), from the proximal end of the launch fibre, taken as d=0. The launch fibre was connected to the cable-coupled optical fibre within the electric cable and the connection point is visible as a sharp peak at about d=1 km. In the example, the electric cable, and thus also the optical fibre, is joint in two intermediate positions along the cable length, seen as and indicated in the graph with triangles. The sharp discontinuity at the end of cable-coupled optical fibre originated from the reflection peak at the distal end of the fibre. Near the distal end the presence of a connector gives raise to a perturbation of the trace, indicated in the graph with a triangle. The length, $L_f$, of the optical fibre is determined by the difference between the position in the graph between the proximal end and the distal end of the cable-coupled optical fibre. In the example, $L_f$=4.54 km, which corresponds to the length of the electric cable.

Using an OFDR technique to measure the length of an electric cable according to the present invention can allow to obtain an accuracy of some mm for cable lengths exceeding 0.1 km.

The invention claimed is:

1. A method of measuring a length of an electric cable, comprising:
    providing an electric cable having a cable length and comprising:
        a cable neutral axis;
        a longitudinal structural element comprising at least one electric conductor;
        an elastic mechanically-coupling filler material; and
        an optical fibre unit longitudinally extending along the cable and comprising an optical fibre arranged substantially along the neutral axis,
        wherein the optical fibre unit is mechanically congruent with the longitudinal structural element through the elastic mechanically-coupling filler material, in such a way that the optical fibre unit remains in coaxial alignment with a central longitudinal axis and a substantially constant relationship between the cable length and the length of the optical fibre is maintained so that the optical fibre unit and the longitudinal structural element move substantially as a whole with the same geometrical change, and
        wherein the optical fibre unit is embedded within the elastic mechanically-coupling filler material that surrounds and contacts an outer surface of the optical fibre unit to mechanically couple the optical fibre unit with the longitudinal structural element;
    injecting an optical signal into the optical fibre;
    detecting back-scattered light from the optical fibre responsive to said optical signal;
    analysing the detected back-scattered light as a function of time so as to determine a length of the optical fibre; and
    deriving the cable length from the length of the optical fibre.

2. The method of claim 1, wherein the length of the optical fibre substantially corresponds to the cable length.

3. The method of claim 1, wherein the optical fibre is provided in tight configuration into the optical fibre unit.

4. The method of claim 1, wherein the optical fibre unit comprises a protective sheath surrounding the optical fibre and wherein the elastic mechanically-coupling filler material surrounds and is congruent with the protective sheath.

5. The method of claim 4, wherein the optical fibre unit further comprises a tight buffer layer surrounding the optical fibre and is congruent with the protective sheath.

6. The method of claim 1, wherein the optical fibre has a proximal end and a distal end and analysing the back-scattered light comprises:
    analysing changes in the back-scattered light;
    based on the changes of the scattered light signal, determining the position of the proximal end and of the distal end of the fibre; and
    calculating a length of the optical fibre from a difference between the position of the proximal end and the position of the distal end of the optical fibre.

7. The method of claim 6, comprising:
    providing a cleaved distal end of the optical fibre;
    injecting an optical signal into the proximal end of the optical fibre, detecting scattered light emitted from the proximal end of the optical fibre; and
    identifying a reflection peak corresponding to the position of the distal end of the optical fibre.

8. The method of claim 1, wherein analysing the scattered light comprises using an optical time domain reflectometer apparatus.

9. An electric flat cable having a longitudinal axis and comprising:
    cable cores positioned substantially parallel, adjacent one to another and centered along a common axis parallel to a direction transversal to the longitudinal cable axis, each core comprising a plurality of stranded conducting wires, said cores including a central core;
    at least one strength member longitudinally disposed within a space located between the cores;
    a cable neutral axis; and
    a cable-coupled optical fibre unit longitudinally extending along the cable and comprising an optical fibre arranged substantially along the neutral axis,
    wherein the optical fibre is mechanically coupled with the cable, and wherein the plurality of stranded conducting wires of the central core are stranded around the optical fibre unit; and
    the optical fibre unit is arranged within the central core along its central longitudinal axis and is mechanically congruent with at least one of the plurality of stranded conducting wires through an elastic mechanically-coupling filler material in such a way that a substantially constant relationship between the cable length and the length of the optical fibre is maintained so that the optical fibre unit and the at least one of the plurality of stranded conducting wires move substantially as a whole with the same geometrical change.

10. The electric flat cable of claim 9, wherein the electric flat cable is a three-phase cable comprising said central core and two outer cores.

11. The electric flat cable of claim 9, wherein the common axis is the middle axis of the cable cross-section so that the central longitudinal axis of the central core crosses the middle axis, which corresponds to the cable neutral axis.

12. A cable having a longitudinal axis and comprising:
    a plurality of cable cores positioned substantially parallel, adjacent one to another and centered along a common axis parallel to a direction transversal to the longitudinal cable axis, each core comprising a plurality of stranded conducting wires, said cores including a central core, and at least one of the plurality of cable cores including an electric conductor;
    a cable neutral axis;
    an elastic mechanically-coupling filler material; and
    a cable-coupled optical fibre unit longitudinally extending along the cable and comprising an optical fibre arranged substantially along the neutral axis, wherein the optical fibre unit is mechanically congruent with the at least one of the plurality of cable cores including the electric conductor in such a way that the optical fibre unit remains in coaxial alignment with a central longitudinal axis and a substantially constant relationship between the cable length and the length of the optical fibre is maintained so that the optical fibre unit and the at least one of the plurality of cable cores move substantially as a whole with the same geometrical change, and
    wherein the optical fibre unit is embedded within the elastic mechanically-coupling filler material that surrounds and contacts an outer surface of the optical fibre unit to mechanically couple the optical fibre unit with the at least one of the plurality of cable cores, and wherein:

the plurality of stranded conducting wires of the central core are stranded around the optical fibre unit; and the optical fibre unit is arranged within the central core along its central longitudinal axis and is mechanically coupled with at least one of the plurality of stranded conducting wires.

* * * * *